United States Patent [19]
McCormack

[11] 3,783,284
[45] Jan. 1, 1974

[54] METHOD AND APPARATUS FOR DETECTION OF PETROLEUM PRODUCTS

[75] Inventor: Kent McCormack, Richardson, Tex.

[73] Assignee: Texas Instruments Incorporated, Dallas, Tex.

[22] Filed: Oct. 28, 1971

[21] Appl. No.: 193,439

[52] U.S. Cl. .............. 250/339, 250/301, 250/341, 250/345, 250/504
[51] Int. Cl. .................................. G01n 21/34
[58] Field of Search .......... 250/43.5 R, 83.3 H, 250/226; 340/228 S, 236

[56] References Cited
UNITED STATES PATENTS

| | | | |
|---|---|---|---|
| 3,603,952 | 9/1971 | Smith | 250/83.3 X |
| 3,405,268 | 10/1968 | Brunton | 250/83.3 |
| 3,451,254 | 6/1969 | Maley | 250/83.3 X |
| 3,539,807 | 11/1970 | Bickel | 250/83.3 |
| 3,031,576 | 4/1962 | Loy | 250/83.3 |
| 3,143,648 | 8/1964 | Bradley et al. | 250/43.5 |

*Primary Examiner*—William F. Lindquist
*Attorney*—Harold Levine et al.

[57] ABSTRACT

Disclosed is a method and apparatus for indicating the presence or absence of petroleum products in a water area by utilizing an active infrared source which illuminates the water area which may contain a petroleum product. The reflected infrared radiation is filtered by two filters at two different wavelengths, $\lambda_1$ and $\lambda_2$. Two infrared detectors produce signals which are proportional to the detected reflected radiation at the wavelengths $\lambda_1$ and $\lambda_2$. A processing channel is connected to each detector, the processing channels each including a log amplifier, the output of which is coupled to a differencing circuit which produces an output signature signal, $\ln [V(\lambda_1)/V(\lambda_2)]$, which indicates either the presence or absence of the petroleum products in the water area.

17 Claims, 11 Drawing Figures

METHOD AND APPARATUS FOR DETECTION OF PETROLEUM PRODUCTS

This invention relates to pollution detection and more particularly to a method and apparatus for detecting and sensing the presence or absence of petroleum products, such as oil, in or on water.

The existence of oil spills in the Atlantic and Pacific Oceans as well as the Gulf of Mexico creates an unpleasant sight and odor as well as actual harm to marine life. The need for an early warning system to detect the violator and to initiate clean-up procedures is brought out by the cost of clean-up in some recent oil spill cases wherein millions of dollars have been expended by major oil companies to clean-up various coastlines.

However, the largest portion of oil which is spilled does not result from the large spectacular events publicized, such as the leak from or destruction of an oil tanker or leak from an offshore oil operation. The major portion of the oil pollution results from the smaller, more common spills of between 100 and 1,000 barrels of oil which inundate the inland waterways. Accordingly, there is a need for collecting sufficient data, on a continuous real-time basis, to be able to identify the party responsible for the detected effluent and qauntitatively determine the amount and type of discharge.

Accordingly, it is an object of this invention to provide a method and apparatus for rapidly detecting and sensing in real time the presence of petroleum products on the water's surface and emulsified petroleum products in the water from sewage discharges.

Another object of the present invention is to provide a compact system which is inexpensive and easy to maintain.

Yet another object of the present invention is to provide a system which is operable during the day or night and can operate under all environmental conditions including rain, fog, salt spray and air pollutents.

Another object of the present invention is to provide a method and apparatus for detecting petroleum products in or on water regardless of the surface state or condition of the water.

Still another object of the present invention is to provide an apparatus which will detect petroleum products from large heights above the water surface.

Other objects and features of the invention will become more readily understood from the following detailed description and appended claims when read in conjunction with the accompanying drawings, in which like reference numerals designate like parts throughout the figures thereof, and in which:

Figure 1:
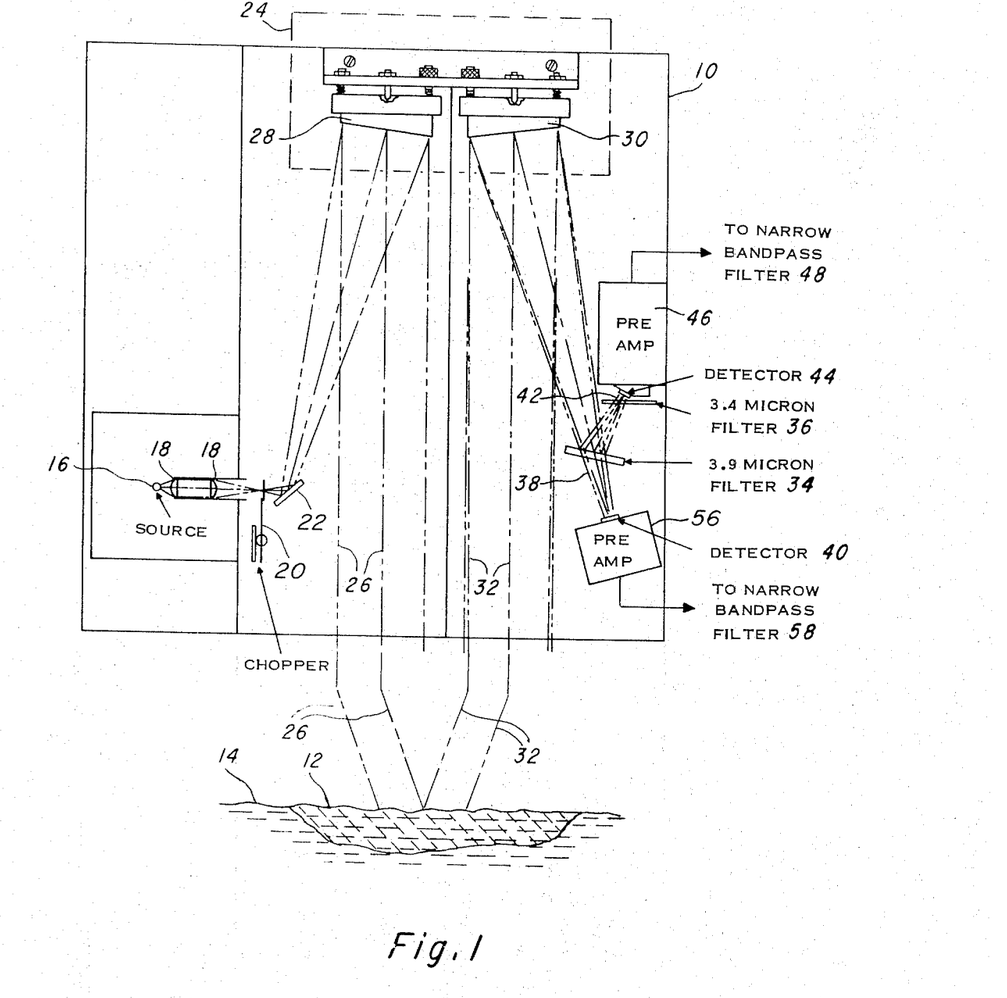
FIG. 1 is an optical schematic of an active infrared oil detection system according to the present invention.

Referring now to FIG. 1, there is illustrated the sensing and monitoring system 10 according to the present invention. This system 10 is mounted on a structure (such as a tower or loading dock) to detect the presence or absence of petroleum products 12, such as oil, in or on a water area 14. For the system 10 to work during day or night and be independent of meteorological conditions, it is desirable to use an active energy source 16, which in the preferred embodiment emits radiation in the infrared region to illuminate the water area 14. Active energy source 16 may be, for example, a laser or a discharge tube (e.g., xenon). Relay lens system 18 is utilized for efficient collection of the radiation from source 16 and refocused for chopping. Chopping or modulation of the radiation from source 16 may be performed by a tuning fork 20 whose resonance is at a selected frequency, such as 400 hertz. The tuning fork 20 is driven by electronic circuitry (not shown). The modulated infrared radiation is reflected by a folding mirror 22 into optical system 24. The optical system 24 transmits the radiation 26 onto water surface 14 which may have present a petroleum product, such as oil slick 12, on the surface thereof.

Optical system 24 is shown as comprising transmitting and receiving paraboloid mirrors 28 and 30, respectively. Accordingly, the optical system 24 results in the system 10 being a staring system, i.e., one which has a single resolution element. However, system 10 could scan an area, if required, by the use of additional mirrors associated with optical system 24. A suitable scanning optical system is shown in U.S. Pat. No. 3,211,046 to H. V. Kennedy.

The transmitted radiation 26 is reflected from the water surface area 14 (or oil slick 12) and impinges upon receiving paraboloid mirror 30. This reflected modulated infrared radiation 32 is in turn reflected from said mirror 30 onto two narrowband interference filters 34 and 36. Filter 34 operates as a beam-splitter to allow the reflected radiation 32 to pass in a very narrow bandwidth of radiation 38 centered at a wavelength of $\lambda_2$. This radiation 38 centered at a wavelength of $\lambda_2$ impinges upon detector 40. All of the remaining radiation is reflected from filter 34 and passes through filter 36 which in turn passes only radiation in a very narrow bandwidth of radiation 42 centered at a second wavelength $\lambda_1$. The radiation 42 centered at $\lambda_1$ impinges on detector 44. Detectors 40 and 44 may be PbSe IR detectors. For purposes of explanation, it will be assumed that $\lambda_1$ is of shorter wavelength than $\lambda_2$.

Figure 2:
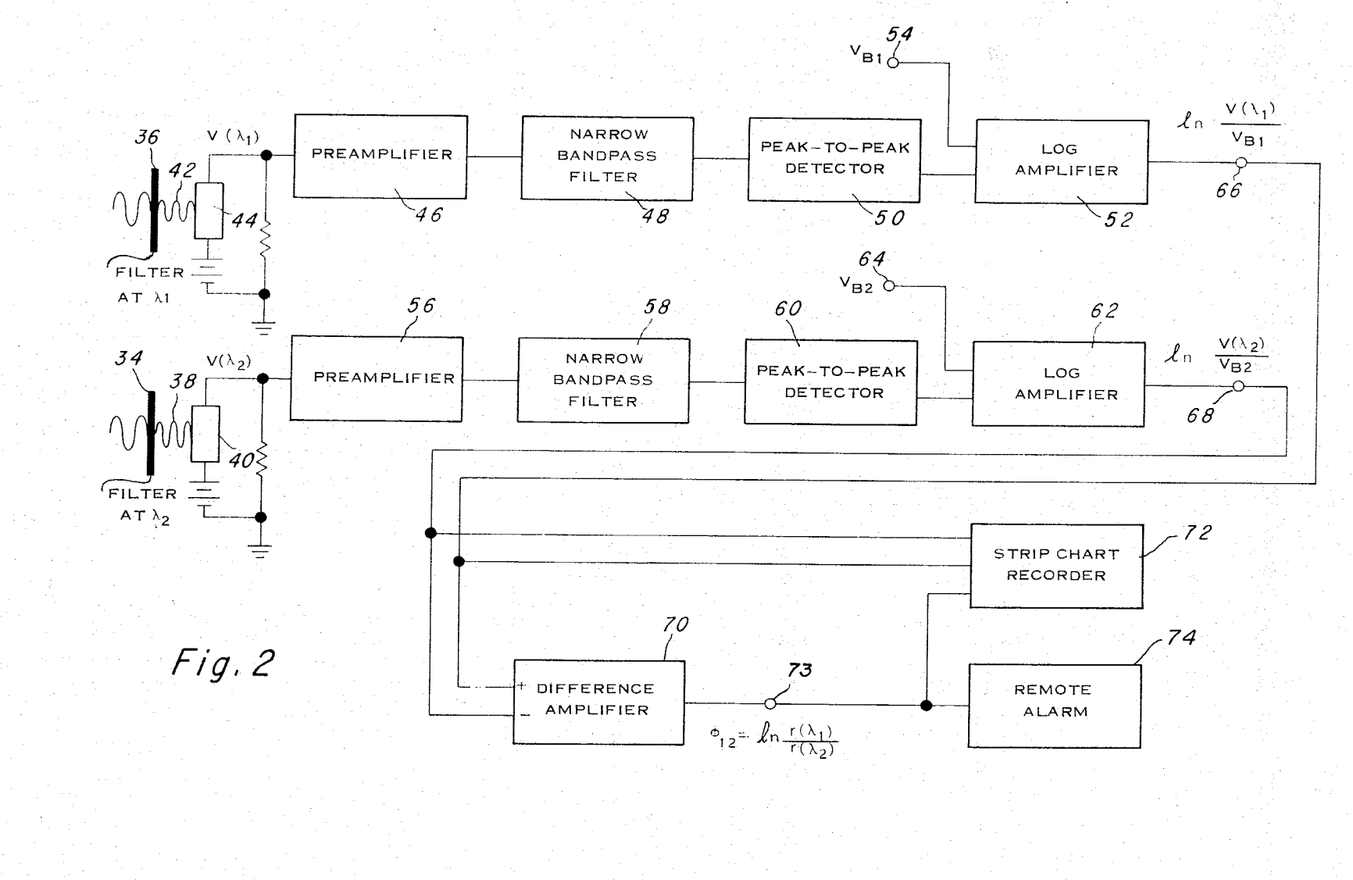
FIG. 2 is a block diagram of the processing circuitry utilized with the oil detection system illustrated in FIG. 1.

FIG. 2 illustrates a block diagram of the processing circuitry for the system of FIG. 1. The detectors 44 and 40 are each coupled to similar processing channels. The detector 44 produces an output signal $V(\lambda_1)$, which is related to the amount of radiation impinging upon detector 44 at wavelength $\lambda_1$. Detector 44 is in turn coupled to preamplifier 46, narrow bandpass filter 48, peak-to-peak detector 50 and log amplifier 52. Log amplifier 52 has an additional input $V_{B1}$ which is a bias voltage applied at terminal 54. In like manner, the output of detector 40 produces a signal $V(\lambda_2)$ which is related to the amount of radiation 38 impinging thereon at wavelength $\lambda_2$. The output of detector 40 is coupled to preamplifier 56, narrow band-pass filter 58, peak-to-peak detector 60 and log amplifier 62. Log amplifier 62 also has an additional input signal $V_{B2}$, which is a biasing signal applied at terminal 64. The outputs 66 and 68 from log amplifiers 52 and 62, respectively, are applied to a difference circuit or amplifier 70 and to a strip chart recorder 72. The output signature signal at output terminal 73, identified as $\Phi_{12}$, is applied to strip chart recorder 72 and to additional monitoring equipment, such as remote alarm 74. A typical log amplifier is described in Fairchild Semiconductor Linear Integrated Circuits Applications Handbook, Library of Congress, Catalog No. 67-27446, pages 150-151.

Figure 3:
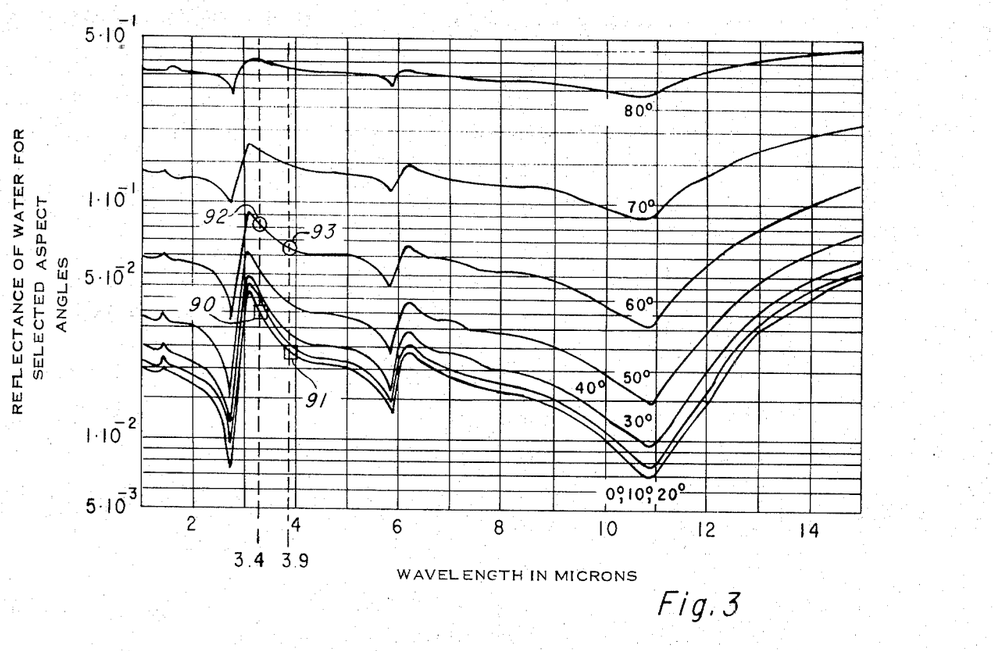
FIG. 3 illustrates the spectral reflectance of water in the infrared region for selected aspect angles.

The operation of the system illustrated in FIGS. 1 and 2 can best be understood by first referring to the data in FIG. 3 which illustrates the reflectance of water for selected aspect angles in the infrared region. Aspect angle may be defined as the angle of incidence (or reflectance) that the infrared radiation makes with respect to the normal of the reflecting surface. As can be seen, the absolute magnitude of the reflectance at a fixed wavelength varies strongly with aspect angle. By that it is meant that at 3.4 microns for 0° aspect angle the reflectivity is approximately $3.75 \times 10^{-2}$ while for the same wavelength at an aspect angle of 60°, the reflectivity is approximately $8 \times 10^{-2}$. However, it should be further noted from FIG. 3 that the ratio of the reflectivity coefficients is essentially independent of aspect angles for two different wavelengths. To clarify this we will denote the reflectivity ($r$) at a specific wavelength and aspect angle as $r_\alpha (\lambda)$ where $\alpha$ is the aspect angle and $\lambda$ is the specific wavelength. Then it will be noted because of the similarity of shapes of the reflectivity curves in FIG. 3 for various aspect angles that:

$$[r_{\alpha_1}(\lambda_1)/r_{\alpha_2}(\lambda_2)] \approx [r_{\alpha_1}(\lambda_1)/r_{\alpha_2}(\lambda_2)] \quad (1)$$

Assume $\lambda_1 = 3.4$ microns, $\lambda_2 = 3.9$ microns, $\alpha_1 = 60°$ and $\alpha_2 = 0°$, then $$[r60°(3.4)/r60°(3.9)] \approx [r0°(3.4)/r0°(3.9)] \quad (2)$$

$$\text{(Point 90/Point 91)} \approx \text{(Point 92/Point 93)}$$

This ratio may be substantiated by reference to points 90-93 on the curves in FIG. 3.

If the reflectance is thought of as a series of specular reflectance events, then the ratio of reflected returns at two different wavelengths will be essentially independent of surface conditions of the water. This would be true even though the absolute reflectance of the single wavelength channels would vary by several orders of magnitude for a variance in surface conditions. As long as the area 14 viewed and illuminated by system 10 is larger than any surface state conditions (waves, etc.), there is a non-zero probability of a portion of the illuminating radiation being reflected at 0° aspect angle.

To utilize this desired effect of ratioing, log amplifiers 52 and 62 (FIG. 2) are utilized to form the ratios. To have a remote alarm capability (such as remote alarm 74), a strong signature signal of oil and water must be present. By signature signal, it is meant the ratio of reflected radiance at two different wavelengths. The signals used in forming the signature are obtained by processing the output of detectors 44 and 40, filtered at wavelengths $\lambda_1$ and $\lambda_2$, respectively. The output signals from detectors 44 and 40 can be expressed generically as:

$$V(\lambda_i) = R_i r(\lambda_i) S P_t(\lambda_i) \quad (3)$$

where $V(\lambda_i)$ = the output signal from the detector (either 44 or 40) at $\lambda_i$ $R_i$ = system response $r(\lambda_i)$ = surface reflectivity at $\lambda_i$ $S$ = scattering coefficient due to surface condition and aspect angle $P_t(\lambda_i)$ = total power from the source 16 at the surface 12 which is in the detector's field of view.

The system response, $R_i$, is related to the gain of preamplifiers 46 and 56, the transmission characteristics of filters 36 and 34 as well as the response characteristic of detectors 44 and 40. $P_t(\lambda_i)$ is a function of the power of the light source 16 which is different at the two different wavelengths $\lambda_1$ and $\lambda_2$.

The signature between $\lambda_1$ and $\lambda_2$ is therefore:

$$\Phi_{12} = \ln[V(\lambda_1)/V(\lambda_2)] - K \quad (4)$$

where $$K = \ln V_{B1/VB2}$$

where $V_{B1}$ and $V_{B2}$ are the bias voltages applied to log amplifiers 52 and 62, respectively.

Substituting equation (3) into equation (4) results in $$\Phi_{12} = \ln[r(\lambda_1)/r(\lambda_2)] + [\ln[R_1 P_t(\lambda_1)/R_2 P_t(\lambda_2)] - /n \ln V_{B1}/V_{B2}]] \quad (5)$$

It should be noted in equation (5) that S, the scattering factor due to surface condition and aspect angle, has dropped out of the signature signal $\Phi_{12}$. In other words, the signature signal is independent of the variation in water surface conditions. By properly calibrating and setting the bias voltages $V_{B1}$ and $V_{B2}$, the second and third terms in equation (5) will cancel out resulting in:

$$\Phi_{12} = ln(r(\lambda_1)/r(\lambda_2)) \quad (6)$$

The independence of system 10 from the effects of the surface condition because of the ratioing of $V(\lambda_1)$ to $V(\lambda_2)$ is an important feature of the present invention.

For reliable remote alarm capabilities, the signature for water should be significantly different from that of the petroleum product to be detected (oil, for purposes of example).

Figure 4:
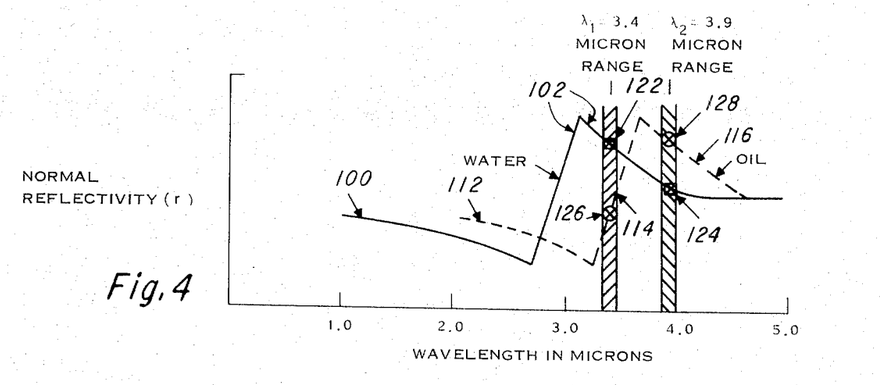
FIG. 4 illustrates the normal reflectivity of water and oil in the 0 to 5 micron region.
Figure 5:
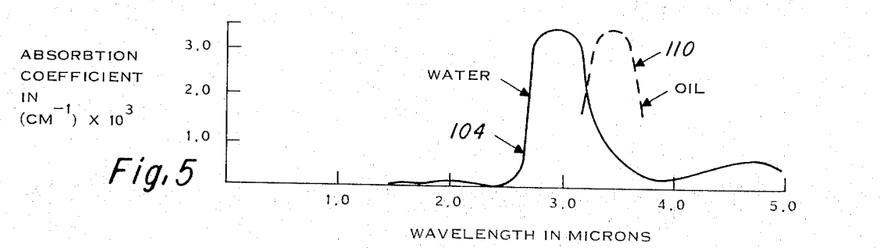
FIG. 5 illustrates the absorption coefficient curves for pure water and a typical oil sample in the 0 to 5 micron range.

FIGS. 4 and 5 illustrate the normal reflectivity and absorption coefficient for water in the 0 to 5 micron region; also included are implied curves for oil. The origin of the oil curves is explained in later paragraphs. As can be noted in FIG. 5, water appears transparent in the visible region of the spectrum and, as can be seen from the absorption coefficient, this continues until 1.5 microns is reached. From this point on, water becomes strongly absorbing. Accordingly, to avoid any subsurface effects in water, the system 10 should operate at wavelengths beyond 1.5 microns. All wavelengths shorter than 1.5 microns would exhibit "subsurface effects." Penetrating the subsurface of the water is undesirable due to erroneous possible alarms because of kelp beds, suspended particles (such as mud and sand) etc. Noting FIGS. 4 and 5, it can be seen that a very strong ratio signal for water can be observed by using one wavelength in the region of 3 to 3.5 microns and the other in the vicinity of 4 microns. The strong variation in the shape of the reflectance curve 100 for water in FIG. 4 is characteristic of a resonance absorption; this is due to the O-H vibrational mode of the water molecules. The shape of the normal reflectivity curve 100 is known as an anomalous dispersion curve. The sharp characteristic of curve 100 shown along the portions 102 of the curve 100 is caused by the absorption characteristic of water around 2.9 microns as shown in FIG. 5, curve 104. As will be noted from curve 104, the absorption coefficient for water is resonant around approximately 2.9 microns. Accordingly the reflectivity curve 100 for water in FIG. 4 exhibits extremely sharp characteristics denoted in portions 102 of that curve.

Figure 6:
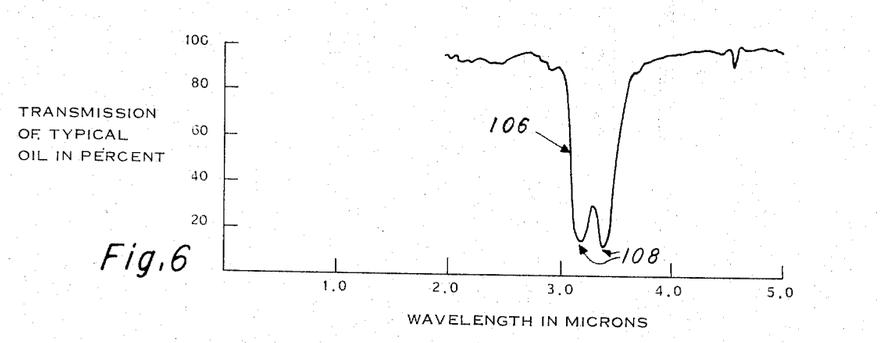
FIG. 6 is an illustration of the transmission characteristics for a typical oil in the 0 to 5 micron region.

The transmission characteristics of a typical oil is illustrated by curve 106 in FIG. 6. The C-H resonance 108 is in the 3.2 to 3.5 micron range. This is present in all hydrocarbon compounds. Accordingly oil will exhibit an absorption coefficient curve 110 (FIG. 5) and normal reflectivity curve 112 (FIG. 4) similar to the respective curves for water, but will be shifted into the 3.2 to 3.5 micron range, instead of the 2.9 micron range as was exhibited by water. The anamolous dispersion phenomena requires that oil (FIG. 5) have a resonant absorption peak in the 3.4 micron range (curve 110) similar to the phenomena that occurs to water at 2.9 microns (curve 104). The reflectivity for oil (FIG. 4) at 3.3 to 3.4 microns on portion 114 of curve 112 will be lower than that at 3.9 microns (on portion 116 of curve 112), since the 3.3 to 3.4 micron range is on the short wavelength side of the resonant characteristic for oil (shown by curve 110 in FIG. 5).

Figure 7:
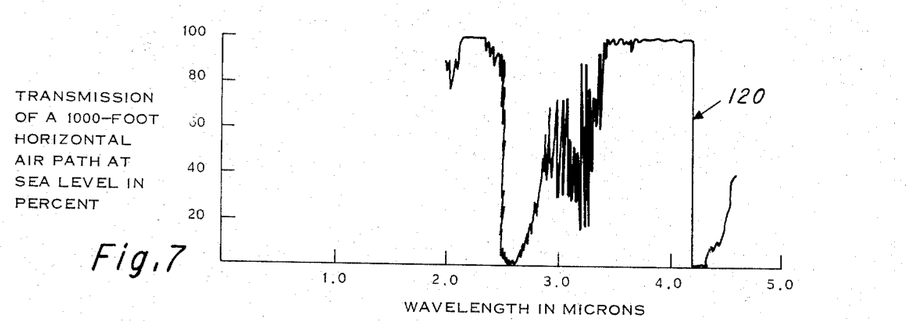
FIG. 7 illustrates the transmission characteristics of a 1,000-ft. horizontal path at sea level in the 0 to 5 micron range.

The wavelengths for maximum signature for water is at 2.75 and 3.1 microns. However, the short wavelength sample, $\lambda_1$, for detector 10 must be taken at a wavelength longer than 2.9 to 3.3 microns because of the water vapor attenuation in the 2.4 to 3.3 micron range. Referring to FIG. 7, this characteristic can be clearly illustrated from curve 120. From curve 120 it can be seen that if the system 10 were placed on a tower or support approximately 1,000 feet above the water area, the short wavelength sample $\lambda_1$ would be limited to approximately 3.3 microns. As can be observed from curve 120, for wavelengths shorter than 3.3 microns, the transmission of IR radiation deteriorates rapidly. For shorter distances, the short wavelength sample $\lambda_1$ might be as small as 2.9 microns. Accordingly, if the system 10 is to operate at distances between, for example 30 and 300 feet, the short sample wavelength $\lambda_1$ should be between 2.9 to 3.4 microns.

A strong water signature which would be practical in terms of both atmospheric transmission and magnitude could be obtained by ratioing the reflectivity at 3.4 microns ($\lambda_1$) to that at 3.9 microns, for example. This may be seen more clearly by reference to the normal reflectivity curves 100 and 112 in FIG. 4 for both water and oil. Assume initially that the system 10 is illuminating a water area 14 and detecting radiation at 3.4 microns ($\lambda_1$) and 3.9 microns ($\lambda_2$). The reflectivity at 3.4 microns would have a magnitude shown on curve 100 at point 122 while at 3.9 microns it would have a smaller magnitude as shown at point 124 on curve 100. This means that the ratio for water $(r(\lambda_1)/r(\lambda_2))$ will be greater than 1.0. Examining the reflectivity curve 112 for oil at the same wavelengths, 3.4 microns ($\lambda_1$) and 3.9 microns ($\lambda_2$), it can be seen that the magnitude of the reflectivity at 3.4 microns for oil is at point 126 which is smaller than the reflectivity of oil at point 128 at 3.9 microns. Accordingly, the ratio $r(\lambda_1)/r(\lambda_2)$ for oil will be less than 1.0. In other words, by measuring the reflectivity from a sample at two different wavelengths $\lambda_1$ and $\lambda_2$ and ratioing the reflectivities from that sample $r(\lambda_1)/r(\lambda_2)$ (where $r(\lambda_1)$ is the short wavelength sample), if the ratio is greater than 1, then only water is present while if the ratio is less than 1, then petroleum products or oil will be present.

It should be noted from the transmission characteristics illustrated in FIG. 7 that at 4.2 microns the transmission of a 1,000 ft. air path is essentially 0. Accordingly, the upper limit for the longer wavelength sample $\lambda_2$ is in the range of 4.2 microns.

Figure 8:
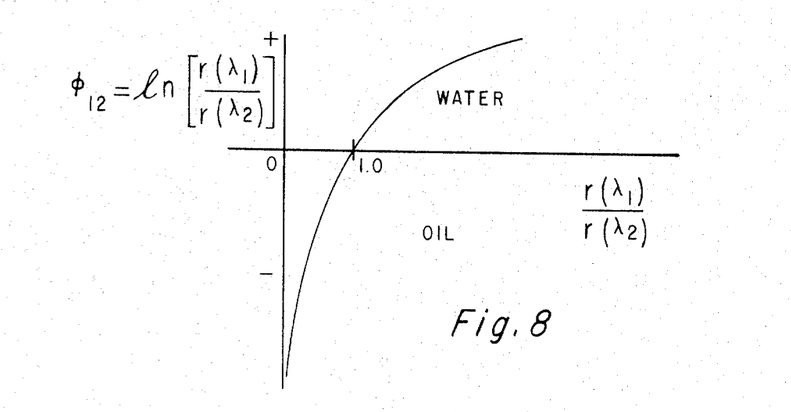
FIG. 8 illustrates the characteristics of the output signature signal from the processing circuitry illustrated in FIG. 2 for both oil and water conditions.

Referring back to FIG. 1, source 16 emits radiation which is modulated by chopper 20 and transmitted by way of folding mirror 22 and paraboloid mirror 28 to the water surface 14 which may have petroleum products thereon. As mentioned previously, sensing and monitoring system 10 is located a predetermined height above water surface 14. The reflected radiation 32 from either the water area 14 or the oil 12 (whichever is present) impinges upon paraboloid mirror 30 and is filtered into two discrete wavelengths centered at $\lambda_1$ and $\lambda_2$ (which as mentioned above $\lambda_1$ will be considered of shorter wavelength than $\lambda_2$). The two detectors 44 and 40 must view simultaneously the surface area illuminated by the trasnmitting portion of the system 10. This is achieved by making one of the two filters 34 and 36 a beamsplitter. As mentioned previously with regard to FIG. 7, the height of the system 10 above the water surface will require that the shorter wavelength sample, $\lambda_1$, be in the range between 2.9 and 3.4 microns. In a preferred embodiment, this shorter wavelength will be nominally centered about 3.4 microns. The longer wavelength sample, $\lambda_2$, may be in the range between 3.4 and 4.2 microns and for purposes of illustration has been assumed to be centered about 3.9 microns (see FIG. 4). The shorter wavelength radiation 42 impinges upon detector 44 and produces an output signal $V(\lambda_1)$. This signal is amplified in preamplifier 46 and narrow bandpass filtered in circuitry 48 at a bandpass frequency related to the frequency of modulation of chopper 20. The output of narrow bandpass filter 48 is coupled to peak-to-peak detector 50 which produces a varying DC signal related to the magnitude of $V(\lambda_1)$. The output of peak-to-peak detector 50 is coupled to log amplifier 52 along with bias signal $V_{B1}$ applied to terminal 54. The output from log amplifier 52 at terminal 66 is equal to the ln $V(\lambda_1)/V_{B1}$. Similar processing occurs in the processing channel connected to detector 40 such that the output from log amplifier 62 at terminal 68 is equal to the ln $V(\lambda_2)/V_{B2}$. The outputs 66 and 68 from log amplifiers 52 and 56 are coupled to the inputs of difference circuit 70. The output from difference circuit 70 is the signature signal $\Phi 12$ which is expressed in equation (5) above. As mentioned earlier, the biasing voltages $V_{B1}$ and $V_{B2}$ are calibrated and set initially such that they are of a magnitude to remove the last two terms in brackets in equation (5). Accordingly, the output signature signal $\Phi_{12}$ at terminal 74 from differencing circuit 70 is expressed as equation (6) and equal to the ln $r(\lambda_1)/r(\lambda_2)$. As mentioned hereinabove, if the ratio $r(\lambda_1)/r(\lambda_2)$ is greater than 1.0 (which would utilize reflectivity points 122 and 124 on curve 100 in FIG. 4), then the system 10 would indicate that only water was present. If the ratio $r(\lambda_1)/r(\lambda_2)$ was less than 1.0 (this would result from the use of points 126 and 128 on curve 112 in FIG. 4), then the system would indicate that oil is present in the water. However, since the ln $r(\lambda_1)/r(\lambda_2)$ is formed at the output terminal 74 of difference amplifier 70, the value ln $r(\lambda_1)/r(\lambda_2)$ will be greater than 0 (positive) as shown in FIG. 8, when only water is present and when the ratio $r(\lambda_1)/r(\lambda_2)$ is less than 1, ln $r(\lambda_1)/r(\lambda_2)$ will be less than 0 (negative) which will indicate that oil is present. The output signature signal $\Phi_{12}$ is coupled to monitoring equipment, such as remote alarm 74, as well as forms one of the inputs to a strip chart recorder 72. If the remote alarm is activated due to the presence of oil, proper reactive measures may be initiated.

Actual tests conducted using the method and apparatus according to the present invention and the results for water and Mansfield crude oil at normal incidence are given in the table below.

For Tap Water $\phi_{3.4, 3.9} = +0.41$*

For Mansfield Crude

| Time | 3.4, 3.9 |
|---|---|
| 0 hour | −0.69 |
| 0.5 hour | −0.43 |
| 2.0 hours | −0.02 |
| 3.0 hours | −0.16 |
| 26.0 hours | −0.01 |

*This corresponds to a reflectivity ratio of 1.50. This can be compared to 1.49 from the data illustrated in FIG. 3 (i.e., ratio of point 90 to point 91).

The results for the water surface compared extremely favorably to the published data shown in FIG. 3. The oil data for Mansfield crude were obtained over a period of 26 hours. There is a time dependence in the oil signature resulting from the continued exposure to the air. However, it should be noted that the signature for oil remains negative while that for water is strong positive (as expected from FIG. 8).

Figure 9A:
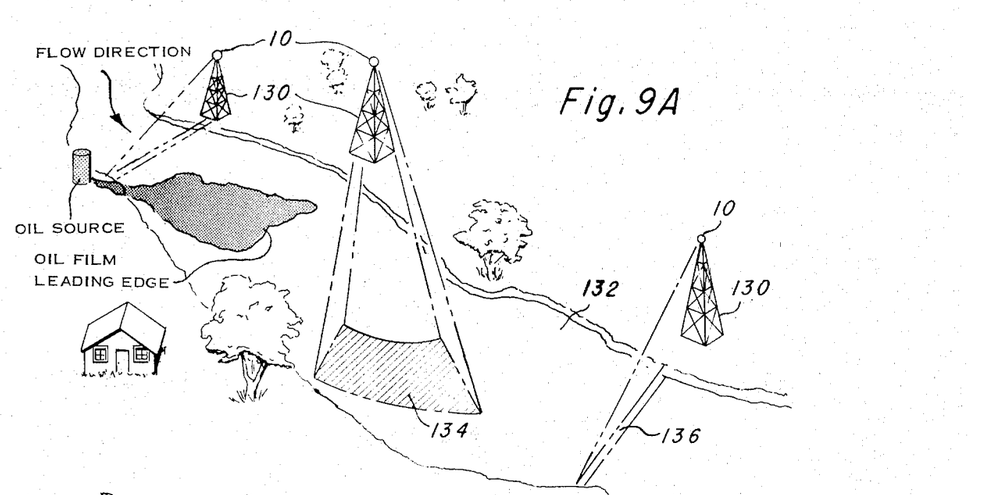
FIGS. 9A–9C illustrate various applications of the detection system according to the present invention.

FIG. 9A illustrates one application of the system 10. Sensing and monitoring system 10 may be mounted on towers 130 which are a predetermined distance above the water surface. These towers will be located along a waterway 132 to detect the presence or absence of oil. The system 10 may be a scanning system thereby having an enlarged field of view 134 or the system 10 may be a staring system having a field of view 136.

Figure 9B:
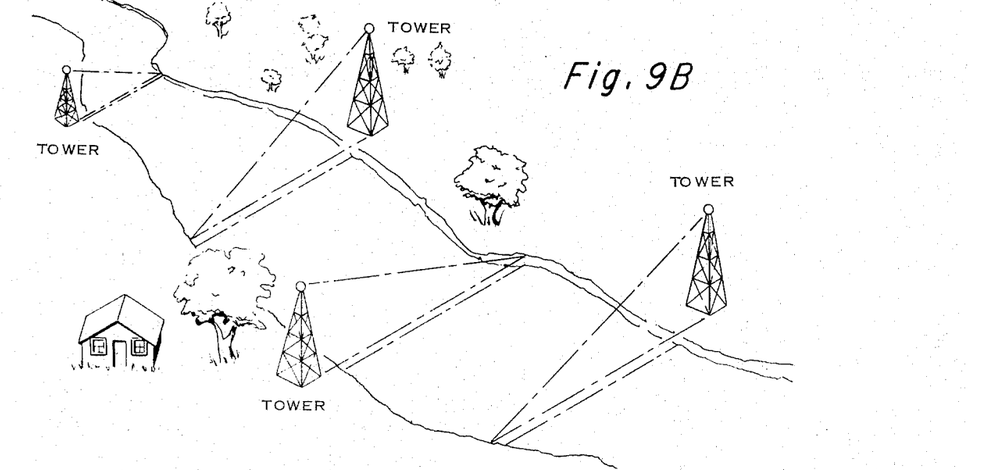

FIG. 9B illustrates the use of a plurality of systems mounted on towers at various locations along a waterway to continuously monitor and detect the presence of petroleum pollution in the water.

Figure 9C:
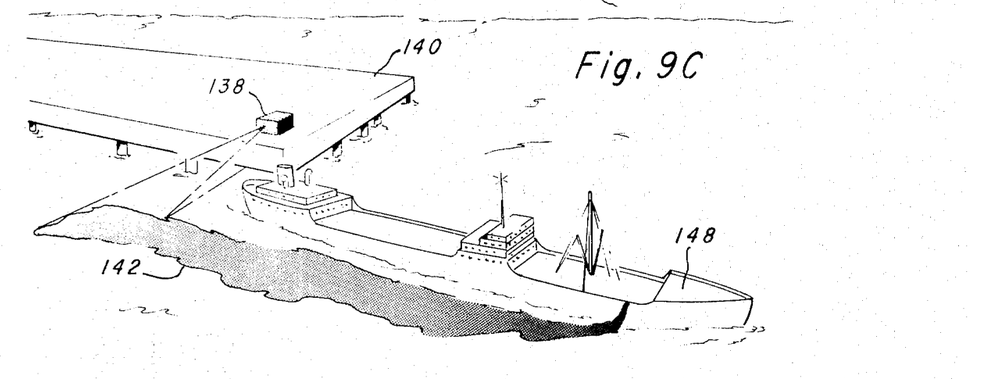

FIG. 9C illustrates a system 138 according to the present invention mounted on a loading dock 140 to monitor and detect oil slicks 142 emanating from the loading and unloading of tanker 148.

Although the present invention has been shown and illustrated in terms of a specific apparatus and method, it will be apparent that changes or modifications can be made without departing from the spirit and scope of the invention as defined by the appended claims.

What is claimed is:

1. A method for indicating the presence or absence of petroleum and petroleum products in a water area comprising the steps of:
   a. illuminating an open water area with modulated infrared radiation;
   b. collecting and focusing the modulated infrared radiation reflected from said area;
   c. detecting substantially simultaneously the reflected focused infrared radiation from said area at wavelengths $\lambda_1$ and $\lambda_2$ adjacent to resonant wavelength of water and petroleum or petroleum products respectively;
   d. producing electrical signals representative of the reflected infrared radiation detected at the wavelengths $\lambda_1$ and $\lambda_2$; and
   e. determining electrically the ratio of the electrical signals representative of the reflected infrared radiation whereby ratios less than one indicate water and ratios greater than one indicate the presence of petroleum or petroleum products in the water area.

2. The method of claim 1 wherein $\lambda_1$ is between about 2.9 and 3.4 microns and $\lambda_2$ is between about 3.4 and 4.2 microns.

3. The method of claim 2 wherein said reflected radiation is detected more than 30 feet from said water area.

4. The method of claim 1 wherein each of said steps (a) through (e) are repeated at a plurality of locations.

5. The method of claim 1 wherein said signals representative of the reflected radiant energy at wavelengths $\lambda_1$ and $\lambda_2$ are log signals, and wherein determining said ratio includes forming the ln $V(\lambda_1)/V(\lambda_2)$ such that a log ratio greater than 0 indicates the absence of petroleum or petroleum products.

6. The method of claim 5 wherein $\lambda_1$ is approximately 3.4 microns.

7. The method of claim 5 wherein $\lambda_2$ is approximately 4.2 microns.

8. The method of claim 1 further including monitoring said electrically determined ratios to actuate an alarm condition when said electrically determined ratios indicates the presence of said petroleum products.

9. The method according to claim 1 wherein the step of determining electrically the ratio of the electrical signals at the $\lambda_1$ and $\lambda_2$ wavelengths representative of the reflected infrared radiation comprises (i) processing the signals in first and second log amplifier circuits to produce signals ln $V(\lambda_1)/V_{B1}$ ln ln $V(\lambda_1)/V_{B2}$ respectively; and (ii) weighting the signals by setting the bias voltage $V_{B1}$ and $V_{B2}$ to cancel each other in a difference amplifier to produce an output signature signal $\Phi_{12} = $ ln $r(\lambda_1)/r(\lambda_2)$.

10. A system for indicating the presence of petroleum type material in an open water area comprising:
   a. an infrared radiation source means positioned independently of the water surface for impinging a beam of infrared radiation upon the open water area;
   b. chopper means in the beam path of the source of infrared radiation for modulating the beam;
   c. means operative to collect and focus infrared radiation reflected from the water area;
   d. filtering means including first and second filters in the focusing path of the reflected infrared radiation operative to pass infrared radiation of first and second wavelengths, $\lambda_1$ and $\lambda_2$, adjacent to resonant wavelength of water and petroleum type material, respectively;

e. first and second detectors positioned to receive respectively the reflected focused infrared radiation of wavelengths $\lambda_1$ and $\lambda_2$ and operative to produce electrical signals representative thereof;

f. first and second log amplifier channels coupled to the first and second detectors operative to produce a pair of signals equal respectively to the log values of the reflected radiation at $\lambda_1$ and $\lambda_2$ wavelengths; and g. a signal differencing means coupled to the first and second log amplifier channels responsive to the pair of signals indicative of the log values of the reflected radiation for providing a signature signal representative of the ratio of the pair of signals.

11. The system of claim 10 wherein $\lambda_1$ is approximately in the range of 2.9 to 3.4 microns and $\lambda_2$ is approximately in the range of 3.4 to 4.2 microns.

12. The system of claim 10 wherein said means for illuminating is a laser means.

13. The system of claim 42 wherein said means for illuminating is a discharge tube.

14. The system of claim 10 wherein $\lambda_1$ is approximately 3.4 microns.

15. The system of claim 10 wherein said signature signal is greater than zero when there are no petroleum products present in said area and said signature signal is less than zero when petroleum products are present in said area.

16. The system of claim 10 wherein a plurality of said systems are located at different locations along a water area to thereby produce a plurality of signature signals which indicate the presence or absence of petroleum products at each of said locations.

17. A system for indicating the presence or absence of petroleum or petrolum products in a water area comprising:

a. an infrared source means positioned independently of the water surface for directing a modulated beam of infrared energy to illuminate the water area;

b. means operative to collect and focus the infrared radiation reflected from the water area;

c. filtering means including first and second filters in the focusing path of the reflected infrared radiation operative to pass infrared radiation adjacent the resonant wavelengths of water and petroleum or petroleum products;

d. detector means positioned to receive substantially simultaneously the reflected infrared radiation passing the first and second filters of the filter means and providing a pair of radiation signals that are a function of the infrared radiation in the two different frequency bands adjacent the resonant frequencies; and e. circuit means coupled to said first and second detectors and responsive to the pair of reflected radiation signals, said circuit means providing a signal that is a function of the ratio between said signals and which is independent of variations of surface conditions and weighted whereby a ratio less than one indicates whether petroleum or petroleum products are present in the water area.

* * * * *